L D CUTLER.
EYEGLASS MOUNTING.
APPLICATION FILED AUG. 2, 1912.

1,053,716.

Patented Feb. 18, 1913.

WITNESSES

INVENTOR
L D Cutler.
BY
ATTORNEYS

UNITED STATES PATENT OFFICE.

L D CUTLER, OF WINDSOR LOCKS, CONNECTICUT.

EYEGLASS-MOUNTING.

1,053,716.  Specification of Letters Patent.  Patented Feb. 18, 1913.

Application filed August 2, 1912. Serial No. 712,859.

*To all whom it may concern:*

Be it known that I, L D CUTLER, a citizen of the United States, and a resident of Windsor Locks, in the county of Hartford and State of Connecticut, have invented new and Improved Eyeglass-Mounting, of which the following is a full, clear, and exact description.

The object of the invention is to provide a new and improved eyeglass mounting having pivoted nose clips pressed on by springs and arranged to prevent the pivot from becoming loose accidentally and to allow of taking off the springs and replacing the same without disturbing the rest of the mounting.

For the purpose mentioned use is made of a bridge connected with lens clips and provided with pivots for nose clips to swing on, and springs coiled on the pivots and bearing at one end on the nose clips and engaging at the other end flattened portions on the pivots.

A practical embodiment of the invention is represented in the accompanying drawings forming a part of this specification, in which similar characters of reference indicate corresponding parts in all the views.

Figure 1:
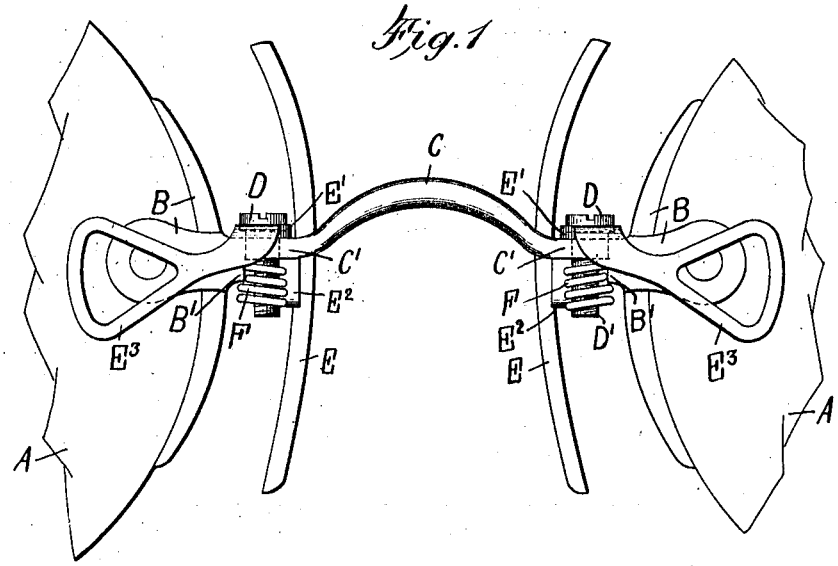
Figure 2:
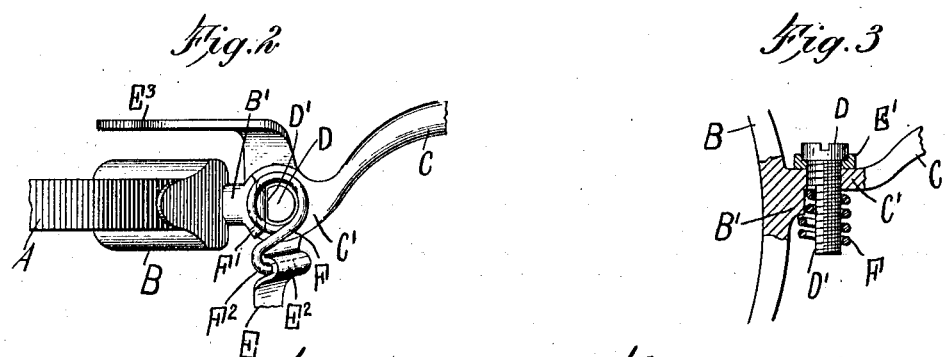
Figure 3:
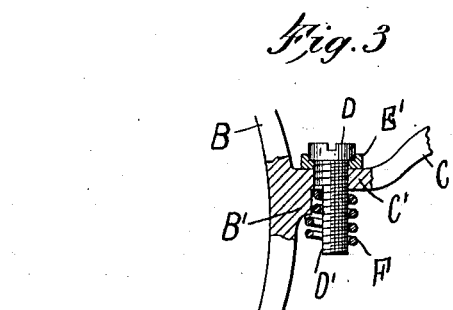
Figure 4:
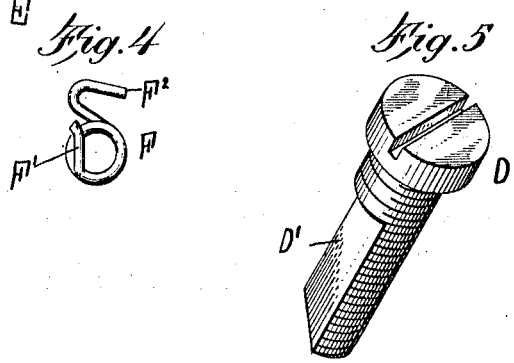
Figure 5:
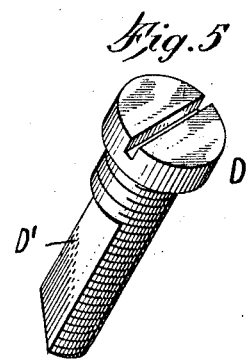

Figure 1 is an enlarged front elevation of a pair of eyeglasses provided with the improvement; Fig. 2 is an inverted plan view of a portion of the mounting; Fig. 3 is a sectional side elevation of the same; Fig. 4 is a plan view of one of the springs; and Fig. 5 is an enlarged perspective view of one of the pivots.

The lenses A of the eyeglasses are attached to lens clips B connected with each other by a bridge C. The bridge C adjacent the lens clips B is provided with flattened portions C' in which are screw threaded pivots D for the shanks E' of nose clips E to swing on. Each of the pivots D is provided immediately below the flattened portions C' with a flattened portion D' arranged directly opposite a flattened surface B' formed by a projection integral with the corresponding lens clip B. Each nose clip E is provided at its shank E' with a seat E² open at the top, and on each pivot D is coiled a spring F having one end F' extending between the space formed by the flattened portion D' and the flattened face B' so that the end F' is held against turning on the pivot D, and the latter is prevented from unscrewing owing to the fact that the end F' extends snugly between the flattened portion D' and the face B'. The other end F² of each spring F is seated in the seat E² to exert the desired pressure on the corresponding nose clip B to press the same inward in firm contact with the corresponding side of the nose. It is understood that by engaging the end F' of the spring F with the seat E² the spring is held from dropping off the pivot D, and by extending the other end of the spring between the flattened portion D' and the face B' this end is held fixed and at the same time the pivot D is prevented from unscrewing in the flattened portion C' of the bridge C. The shank E' of each nose clip E is provided at the front with a fingerpiece E³ adapted to be taken hold of by the user for opening the nose clips E preliminary to placing the nose clips in engagement with the sides of the nose. When the fingerpieces E³ are released the springs F impart an inward swinging motion to the nose clips E so as to firmly engage the same with the sides of the nose.

When it is desired to remove a spring F for any reason whatever, it is only necessary to lift the end F² out of the seat E² to disconnect the spring from the clip and to allow of pulling the spring off the lower end of the pivot D. In a like manner the spring can be replaced by slipping the spring onto the lower end of the pivot D and passing the end F' between the flattened portion D' and the face B' and then lifting the end F² into the seat E². From the foregoing it will be noticed that a spring can be removed and replaced without disturbing any other part of the mounting.

Having thus described my invention, I claim as new and desire to secure by Letters Patent:

1. An eyeglass mounting, comprising a bridge having lens clips for engagement with the lenses, pivots held on the bridge adjacent the said lens clips and provided with flattened portions, nose clips pivoted on the said pivots and provided with seats, and springs coiled on the said pivots and each having one end engaging the seat in the corresponding nose clip, the other end of the spring fitting between the lens clip and the flattened portion of the pivot on which the spring is coiled.

2. An eyeglass mounting, comprising a bridge having lens clips for engagement with the lenses, pivots held on the bridge adjacent the said lens clips and provided with flattened portions, integral projections on the said end clips directly opposite and spaced from the said flattened portions of the pivots, nose clips pivoted on the said pivots and provided with seats, and springs coiled on the said pivots and each having one end engaging the seat in the corresponding nose clip, the other end of the spring extending in the space between the flattened portion of the corresponding pivot and the opposite projection.

In testimony whereof I have signed my name to this specification in the presence of two subscribing witnesses.

L D CUTLER.

Witnesses:
  LEON WILCOX,
  FRED KOEHLER, Jr.